(12) United States Patent
Sawamura et al.

(10) Patent No.: US 7,252,067 B2
(45) Date of Patent: Aug. 7, 2007

(54) POWER TRANSMISSION SYSTEM FOR VEHICLE

(75) Inventors: Yoshinobu Sawamura, Saitama (JP); Yukihiro Tsubakino, Saitama (JP); Teruo Kihara, Saitama (JP); Yasuyuki Kuroiwa, Saitama (JP); Hideki Ikeda, Saitama (JP); Kiyotaka Fujihara, Saitama (JP)

(73) Assignee: Honda Motor Co., Ltd., Toyko (JP)

( * ) Notice: Subject to any disclaimer, the term of this patent is extended or adjusted under 35 U.S.C. 154(b) by 233 days.

(21) Appl. No.: 10/920,190

(22) Filed: Aug. 18, 2004

(65) Prior Publication Data

US 2005/0076877 A1    Apr. 14, 2005

(30) Foreign Application Priority Data

Aug. 20, 2003    (JP) ............................. 2003-296017

(51) Int. Cl.
*F02B 75/32* (2006.01)
*F02F 7/00* (2006.01)
*F02N 17/00* (2006.01)

(52) U.S. Cl. ............................. 123/197.1; 123/179.25

(58) Field of Classification Search ............. 123/197.1, 123/179.25
See application file for complete search history.

(56) References Cited

U.S. PATENT DOCUMENTS 6,386,067 B1 *  5/2002  Inoue et al. ............... 74/730.1
6,575,143 B2 *  6/2003  Uemura et al. ............. 123/490
6,712,172 B2 *  3/2004  Inagaki et al. ............. 180/292

FOREIGN PATENT DOCUMENTS

CN    1257018 A    2/2004
JP    2001-295867 A    10/2001

* cited by examiner

*Primary Examiner*—Stephen K. Cronin
*Assistant Examiner*—Arnold Castro
(74) *Attorney, Agent, or Firm*—Birch, Stewart, Kolasch & Birch, LLP

(57) ABSTRACT

To provide a power transmission system for a vehicle wherein a starter is simplified, the number of component parts is small, and a reduction in cost can be contrived. Thus, an excellent operationality at the time of starting is achieved. A power transmission system for a vehicle, including a clutch and a fluid transmission through both of which the rotational torque of a crankshaft of an internal combustion engine is transmitted to a load-side transmission mechanism, wherein the clutch and the fluid transmission are both provided on one side of the crankshaft, and a drive force of a starter is directly inputted to the other side of the crankshaft.

16 Claims, 4 Drawing Sheets

POWER TRANSMISSION SYSTEM FOR VEHICLE

CROSS-REFERENCE TO RELATED APPLICATIONS

The present application claims priority under 35 USC 119 to Japanese Patent Application No. 2003-296017 filed on Aug. 20, 2003 the entire contents thereof is hereby incorporated by reference.

BACKGROUND OF THE INVENTION

1. Field of the Invention

The present invention relates to a power transmission system for vehicle in which the rotational torque of a crankshaft of an internal combustion engine is transmitted to a load-side transmission mechanism through a clutch and a fluid transmission means.

2. Description of Background Art

A power transmission system for a vehicle of the above-mentioned type wherein a one-way clutch includes a plurality of sprags for making a locking engagement with an opposite circumferential surface when the rotating speed of an input shaft reaches or exceeds a predetermined value is used as the clutch and in which a torque converter is used as a fluid transmission means is known. See, for example, Japanese Patent Laid-Open No. 2001-295867, Paragraphs [0015] and [0016].

In the power transmission system for vehicle disclosed in Japanese Patent Laid-Open No. 2001-295867, a kick starter gear train is provided between a transmission input shaft and a transmission output shaft of a transmission which is a load-side transmission mechanism. In addition, the drive force of a kick starter is inputted to the load-side transmission mechanism.

To prevent transmission of the starting drive force of the kick starter to the drive wheel side, the gear must be shifted to neutral at the time of starting. Thus, there is a room for improvement in operationality.

In addition, the starting drive force of the kick starter is transmitted from the kick starter gear train through the torque converter of the crankshaft and the one-way clutch so as to turn the crankshaft, so that the load is high.

SUMMARY AND OBJECTS OF THE INVENTION

The present invention has been made in consideration of the above-mentioned points. Accordingly, it is an object of the present invention to provide a power transmission system for a vehicle wherein it is possible to simplify a starting means, to reduce the number of component parts, and to contrive a reduction in cost. Thus, the present invention achieves an excellent operationality at the time of starting.

To attain the above object, the present invention resides in a power transmission system for a vehicle, including a clutch and a fluid transmission means through both of which a rotational torque of a crankshaft of an internal combustion engine is transmitted to a load-side transmission mechanism, wherein the clutch and the fluid transmission means are both provided on one side of the crankshaft. A drive force of a starting means is inputted directly to the other side of the crankshaft.

Since the drive force of the starting means is inputted directly to the crankshaft, it is unnecessary to provide the load-side transmission mechanism with a shift gear for selectively establishing a neutral condition or the like means. Thus, the starting mechanism is simplified, the number of component parts is reduced and a reduction in cost can be contrived. Further, a shifting operation is not needed at the time of starting and operationality is enhanced.

In addition, the load at the time of starting is small and the starting operation can be facilitated.

Since the drive force of the starting means is inputted directly to the side, opposite to the side where the clutch and the fluid transmission means are provided, of the crankshaft, a good weight balance can be easily attained.

The present invention provides a power transmission system for vehicle wherein the fluid transmission means is a torque converter, and the load-side transmission mechanism is a gear mechanism having a fixed speed change ratio.

With the automatic speed change being attained by the torque converter and with the load-side transmission mechanism being a gear mechanism having a fixed speed change ratio, it is possible to configure the load-side transmission mechanism as a gear mechanism having a reduced number of component parts, and to thereby contrive reductions in size and weight and a reduction in cost.

The present invention provides an AC generator on the side, on which the drive force of the starting means is inputted, of the crankshaft.

Since the clutch and the fluid transmission means are disposed on one side of the crankshaft and the AC generator is disposed together with the starting means on the other side, a good weight balance is attained. In addition, the operational stability of the vehicle body can be enhanced when the crankshaft is mounted on the vehicle body while being directed in the left-right direction. Further, a higher compactness in the vehicle width direction can be contrived.

The present invention provides the drive force of the starting means that is inputted to a shaft end, located on the outer side relative to the AC generator, of the crankshaft.

Since the drive force of the starting means is inputted to the shaft end, located on the outer side relative to the AC generator, of the crankshaft, the starting means main body can be disposed in the exterior of the internal combustion engine, an optimum starting means among a cell motor, a kick starter, and a recoil starter can be selectively used and changed according to the machine model, and versatility is enhanced.

The present invention provides the starting means that is a kick-type starting means with an exhaust pipe and a muffler being disposed on the opposite side, with respect to the vehicle body, of the kick-type starting means.

Since the kick-type starting means and the muffler (and the exhaust pipe) are provided on the opposite sides with respect to the vehicle body, the muffler and the exhaust pipe can be laid out without taking into account the movable range of a kick pedal. This enhances the degree of freedom in layout. Thus, the appearance can be enhanced by disposing a rear end portion of the muffler at a forwardly deviated position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
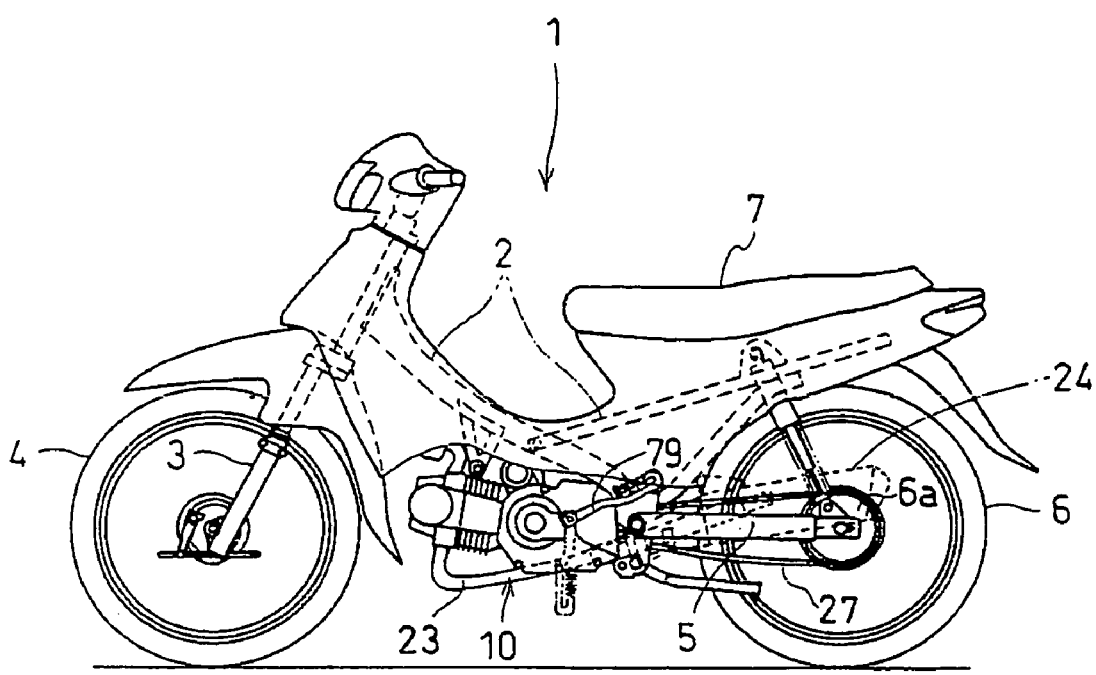
FIG. 1 is a side view of a motorcycle to which the power transmission system according to one embodiment of the present invention has been applied.

Now, one embodiment of the present invention will be described below, based on FIGS. 1 to 3.

The motorcycle 1 has a structure in which a power unit 10 is suspended at the center of a vehicle body frame 2, a front wheel 4 is shaft-supported by a front fork 3 rotatably borne on a front portion of the vehicle body frame 2, and a rear wheel 6 is shaft-supported on the rear end of a rear fork 5 which has its front end movably supported by a central frame of the vehicle body and extends rearwardly.

The upper side of the rear wheel 6 is covered with a seat 7.

The power unit 10 has a structure in which an internal combustion engine 11 and a load-side gear mechanism 12 are integrated with each other. A vertical sectional view thereof is shown in FIG. 3.

A left unit case 13L and a right unit case 13R constituting left and right halves that form a crankcase of the internal combustion engine 11 and a gear case of the gear mechanism 12 are coupled to each other, thereby forming a crank chamber and a gear chamber therein.

A crankshaft 15 disposed in the state of being directed in the left-right direction of the vehicle is borne on the left and right unit cases 13L and 13R through bearings 16L and 16R.

In the internal combustion engine 11, a piston 18 slidably fitted in a cylinder bore in a cylinder block 17 and the crankshaft 15 are connected to each other through a connecting rod 19.

A cylinder head 20 joined to the cylinder block 17 defines a combustion chamber 21 between itself and the top surface of the piston 18, and is provided therein with intake and exhaust valves (not shown) for opening and closing intake and exhaust ports communicated with the combustion chamber 21.

A camshaft 22 for driving the intake and exhaust valves is set parallel to the crankshaft 15 and is rotatably borne on the cylinder head 20.

The gear structure 12 has a structure in which an input shaft 25 and an output shaft 26 disposed in parallel to the crankshaft 15 are rotatably borne on the left and right unit cases 13L and 13R. A primary speed reduction driven gear 25a is mounted to an end portion projecting to the right from the right unit case 13R of the input shaft 25. A driven gear 25b is formed on the left inner side with a drive sprocket 26a being mounted to an end portion projecting toward the left outer side from the left unit case 13L of the output shaft 26. A driven gear 26b is fitted on the right inner side with the driven gear 26b and the drive gear 25b being meshed with each other.

A chain 27 is set between the drive sprocket 26a projecting to the outside from the output shaft 26 and a driven sprocket 6a (see FIG. 1) formed as one body with the rear wheel 6, for constituting a final speed reduction mechanism.

A centrifugal clutch 30, a torque converter 40, and a primary speed reduction drive gear 48a are sequentially disposed on a right-side portion, projecting to the right from the right unit case 13R, of the crankshaft 15 in this order from the right end toward the inner side. The primary speed reduction drive gear 48a is meshed with the primary speed reduction driven gear 25a of the gear mechanism 12.

A right side cover 28 is joined to the right end surface of the right unit case 13R. The cover 28 covers the primary speed reduction mechanism that includes the meshing of the primary speed reduction drive gear 48a and the primary speed reduction driven gear 25a, the centrifugal clutch 30 and the torque converter 40 from the right side.

The centrifugal clutch 30 has a structure in which an inner boss portion 32 for holding the base end of an inner plate 31 of a clutch inner is spline-fitted over a right end portion of the crankshaft 15, and clutch weights 34 are inclinably supported respectively on a plurality of support shafts 33 projecting on the outer circumferential end side of the inner plate 31 in parallel to the crankshaft 15.

An outer plate 35 of a clutch outer has a cylindrical portion covering the clutch weights 34 with its inner circumferential surface opposed to the clutch weights 34. An outer boss portion 36 for holding the base end of the outer plate 35 is tumably supported on the crankshaft 15 through a bearing 37 and is supported on the inner boss portion 32 through a one-way clutch 38.

As the crankshaft 15 is rotated, the clutch inner is rotated as one body with the crankshaft 15. However, the rotational torque is not transmitted to the clutch outer due to the presence of the one-way clutch 38.

When the rotating speed of the crankshaft 15 exceeds a predetermined speed, the inclination of the clutch weights 34 is increased, which acts on the clutch outer 35 to engage the clutch, whereby the clutch outer is rotated.

In addition, the one-way clutch 38 can transmit the rotational torque from the clutch outer side to the clutch inner side.

The torque converter 40 disposed adjacently to the side of the right unit case 13R relative to the centrifugal clutch 30 includes a pump impeller 41 integrally coupled to the outer boss portion 36 for holding the base end of the outer plate 35 with a turbine impeller 42 opposed to the pump impeller 41 and a stator impeller 43 disposed between these impellers 41 and 42.

A stator boss portion 44 for holding the base end of the stator impeller 43 is spline-fitted over a cylindrical stator shaft 45, the stator shaft 45 is shaft-supported on the crankshaft 15 through a bearing 46 and supported on the right unit case 13R through a free wheel 47. The stator impeller 43 can be rotated in one direction as one body with the stator shaft 45.

A cylindrical turbine shaft 48 for holding the base end of the turbine impeller 42 is rotatably supported on the stator shaft 45 through a bearing 49 with the primary speed reduction drive gear 48a being formed at a left end portion of the turbine shaft 48.

A side cover 50 for covering the back surface of the turbine impeller 42 is integrally coupled to the pump impeller 41. A free wheel 51 for transmitting a back load is interposed between the side cover 50 and the turbine shaft 48.

When the rotating speed of the crankshaft 15 exceeds a predetermined speed and the centrifugal clutch 30 is engaged to cause the pump impeller 41 to rotate together with the clutch outer 35, working oil in the torque converter 40 flows from the side of the outer circumference of the pump impeller 41 by way of the turbine impeller 42 and the stator impeller 43 restricted in rotation by the free wheel 47 back to the side of the inner circumference of the pump impeller 41 so as to transmit the rotational torque of the pump impeller 41 to the turbine impeller 42, thereby driving the turbine shaft 48 that is integral with the turbine impeller 42 to rotate, i.e., driving the primary speed reduction drive gear 48a to rotate.

When the rotating speed of the turbine impeller 42 is increased to approach the speed of the pump impeller 41, the stator impeller 43 is rotated idly by the free wheel 47, and the impellers 41, 42 and 43 are rotated as one body at a high efficiency as a fluid coupling.

Thus, the torque converter 40 displays an automatic speed reduction function.

When a back load at the time of speed reduction is inputted from the side of the gear mechanism 12 to the turbine shaft 48 through the primary speed reduction mechanism, the rotational torque is directly transmitted to the pump impeller 41 through the side cover 50 due to the engagement of the free wheel 51. The rotation of the outer plate 36 integral with the pump impeller 41 is transmitted through the one-way clutch 38 to the crankshaft 15, resulting in engine brake.

On the other hand, an AC generator 60 is attached to a left side portion projecting leftwardly from the left unit case 13L of the crankshaft 15, with a chain sprocket 56 (around which a power transmission chain 55 is wrapped) being interposed between the left unit case 13L and the AC generator 60.

An outer rotor 61 of the AC generator 60 is fitted over a left end portion of the crankshaft 15 with the outer rotor 61 being fastened to the crankshaft 15 by a bolt 64 screwed into the left end of the crankshaft 15, with a boss member 65 therebetween.

A left side cover 63 for covering the AC generator 60 from the left side is joined to a left end surface of the left unit case 13L.

The left side cover 63 is provided with an opening 63a at its portion opposed to the shaft end of the crankshaft 15. An inner stator 62 of the AC generator 60 is supported on a peripheral edge portion of the opening 63a.

The boss member 65 for fixing the outer rotor 61 to the left end of the crankshaft 15 is provided with ratchet teeth 65a projecting leftwardly in an annular form at an end portion penetrating through the opening 63a in the left side cover 63 and projecting to the outside.

Therefore, in the AC generator 60, the inner stator 62 is fixedly supported on the left unit case 13L through the left side cover 63 with the outer rotor 61 being rotated as one body with the crankshaft 15.

A kick starter 70, which is a starting means, is provided on the left side relative to the AC generator 60 and on the outer side relative to the left side cover 63.

A starter cover 71 joined to a left end surface of the left side cover 63 so as to cover a drive transmission mechanism of the kick starter 70 is provided, on the right-side inner surface of a front portion thereof, with a cylindrical support portion 71a projecting coaxially with the crankshaft 15. A ratchet shaft 72 is fitted in the cylindrical support portion 71a in a turnable and axially slidable state.

The ratchet shaft 72 is provided with a driven helical gear 73 at an exposed portion ranging to the right end thereof with a ratchet wheel 74 is attached to the right end. Ratchet teeth 74a are formed at an end portion projecting in an annular form to the right side of the ratchet wheel 74 and are opposed to the ratchet teeth 65a of the boss member 65 fixed to the left end of the crankshaft 15.

A friction spring 75 interposed between the starter cover 71 and the ratchet wheel 74 biases the ratchet shaft 72 together with the ratchet wheel 74 leftwardly. When the ratchet wheel 74 is moved to the right against the friction spring 75, the ratchet teeth 74a of the ratchet wheel 74 are meshed with the ratchet teeth 65a of the boss member 65.

A bearing boss portion 71b is bulged inwardly at a side wall of a rear portion of the starter cover 71 with a kick shaft 76 penetrating through and being turnably borne on the bearing boss portion 71b. The left end of the kick shaft 76 projects to the left outer side. The right end of the kick shaft 76 is turnably fitted in the left side cover 63.

A drive helical gear 77 is integrally fitted over the kick shaft 76 and is biased in one rotating direction by a return spring 78 with the drive helical gear 77 being meshed with the helical gear 73 of the ratchet shaft 72.

A kick pedal 79 is vertically oscillatably mounted to the left end of the kick shaft 76, with its base end portion attached to the left end.

Therefore, when the kick pedal 79 is stepped in and the kick shaft 76 is rotated against the return spring 78, the drive helical gear 77 is rotated as one body with the kick shaft 76. The driven helical gear 73 meshed with the drive helical gear 77 is slid rightwards against the friction spring 75 while rotating together with the ratchet shaft 72. The ratchet teeth 74a of the ratchet wheel 74 are meshed with the ratchet teeth 65a of the boss member 65, whereby the crankshaft 15 is forcibly rotated, and the internal combustion engine 11 can be started.

The rotational torque of the crankshaft 15 generated upon stepping-in of the kick pedal 79 at the time of starting rotates only the clutch inner of the centrifugal clutch 30 because the rotating speed is low. The rotational torque is not transmitted to the clutch outer and the subsequent drive transmission system, so that the starting operation can be achieved lightly and easily.

Thus, in the present power transmission system, the drive force of the kick starter 70 is inputted directly to the crankshaft 15. Therefore, it is unnecessary to provide the gear mechanism 12 on the load side with a shifting device for selectively establishing a neutral condition or the like means. Thus, the starting mechanism is simplified, the number of component parts is reduced and a reduction in cost can be contrived. In addition, a shifting operation is not needed at the time of starting and operationality is enhanced.

Since the kick starter 70 is located at the left end of the crankshaft 15 and is engaged with and turned as one body with the crankshaft 15 through the sliding of the ratchet wheel 74 at the time of starting, the kick starter 70 is separate from the crankshaft 15 at other times than the time of starting, so that higher output characteristics can be contrived without increasing the inertial mass of the crank system.

Since the centrifugal clutch 30 and the torque converter 40 are disposed on one side of the crankshaft 15 and the AC generator 60 is disposed together with the kick starter 70 on the other side of the crankshaft 15, a good weight balance on the left and right sides can be attained. Thus, the operational stability of the vehicle is enhanced, and a higher compactness in the vehicle width direction can be contrived.

The power transmission system according to the present embodiment is a system in which an automatic speed change is achieved by the torque converter 40. The gear mechanism 12 has a fixed speed change ratio by the meshing of a set of gears 25b and 26b, so that the gear mechanism 12 does not need a shifting device, has a small number of component parts, is simple in structure and it is possible to contrive reductions in size and weight and a reduction in cost.

Figure 2:
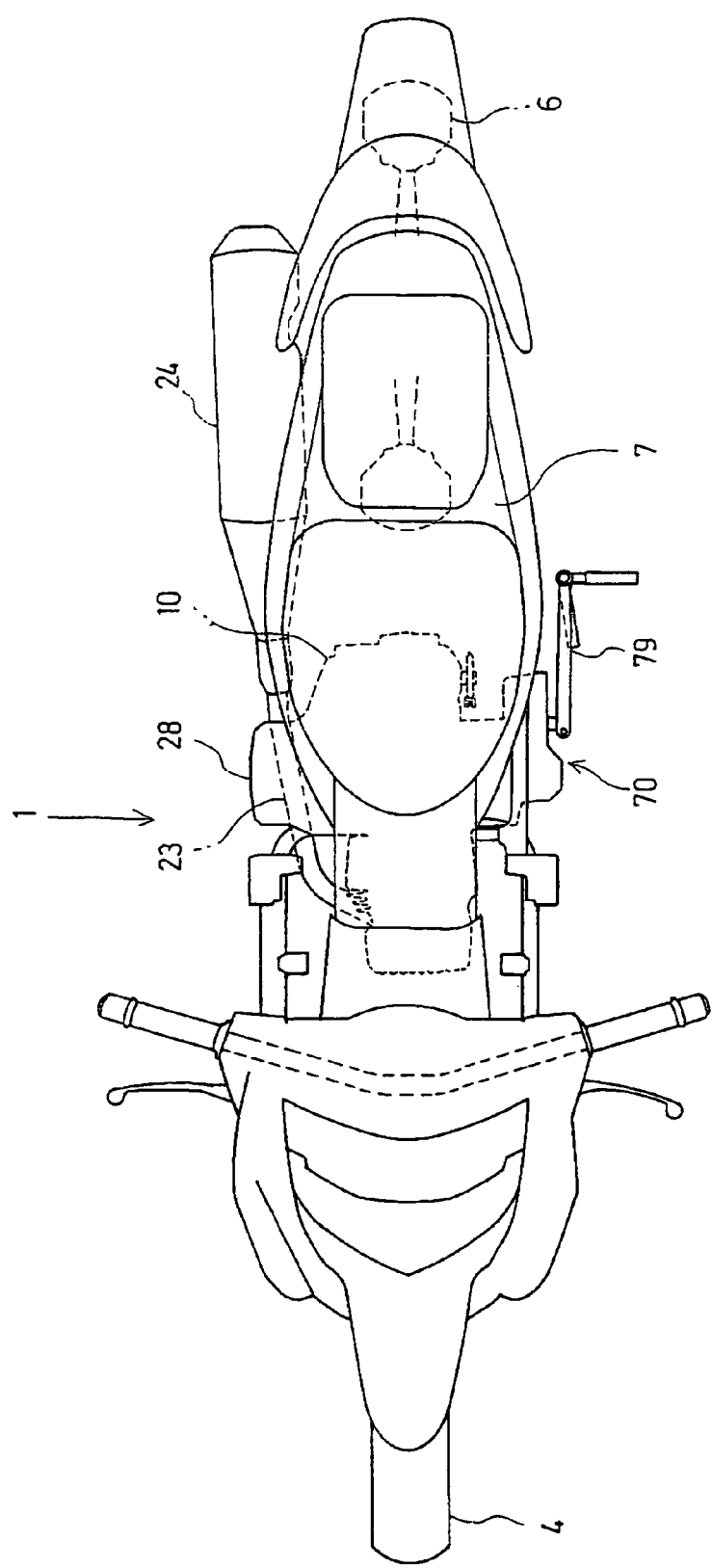
FIG. 2 is a plan view of the motorcycle.
Figure 3:
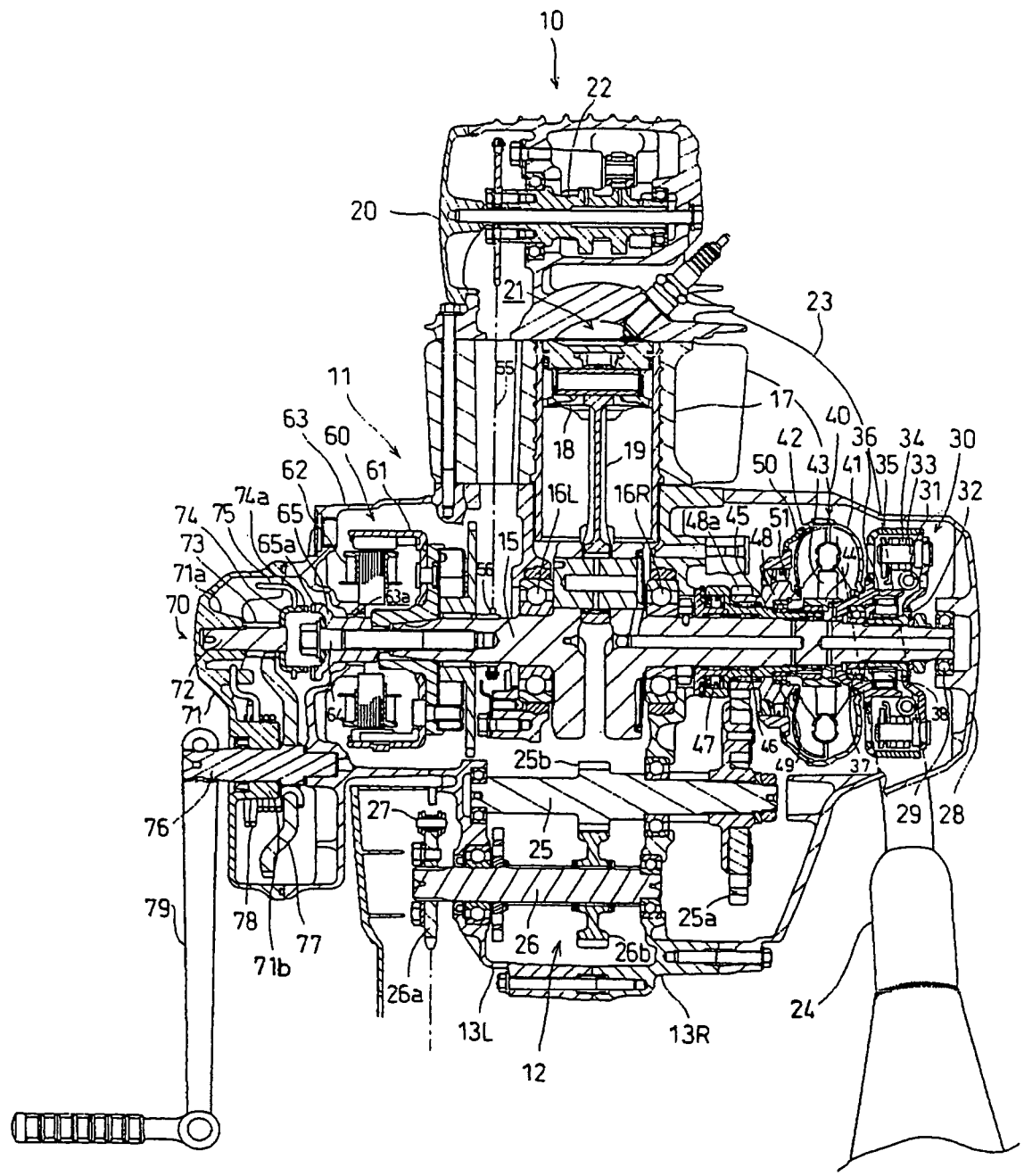
FIG. 3 is a vertical sectional view of a power unit in the power transmission system.

In addition, referring to FIGS. 1 to 3, the exhaust pipe 23 extends downwardly from the cylinder head 20 and is inclined forwardly nearly to be substantially horizontal of the internal combustion engine 11 and extends rearwardly along the lower surface of the right side cover 28 while being skewly deviated to the right side. The exhaust pipe 23 is then connected to the muffler 24, and extends rearwardly on the right side of the rear wheel 6 while directing slightly upwardly.

Since the muffler 24 is provided on the right side of the vehicle body and is disposed on the opposite side of the kick starter 70, the muffler 24 and the exhaust pipe 23 can be laid out without taking into account the movable range of the kick pedal 79. Thus, the degree of freedom in layout is enhanced. In addition, with a rear end portion of the muffler 24 disposed in the state of being deviated forwardly, the overall length of the muffler 24 can be reduced and appearance can be enhanced.

Figure 4:
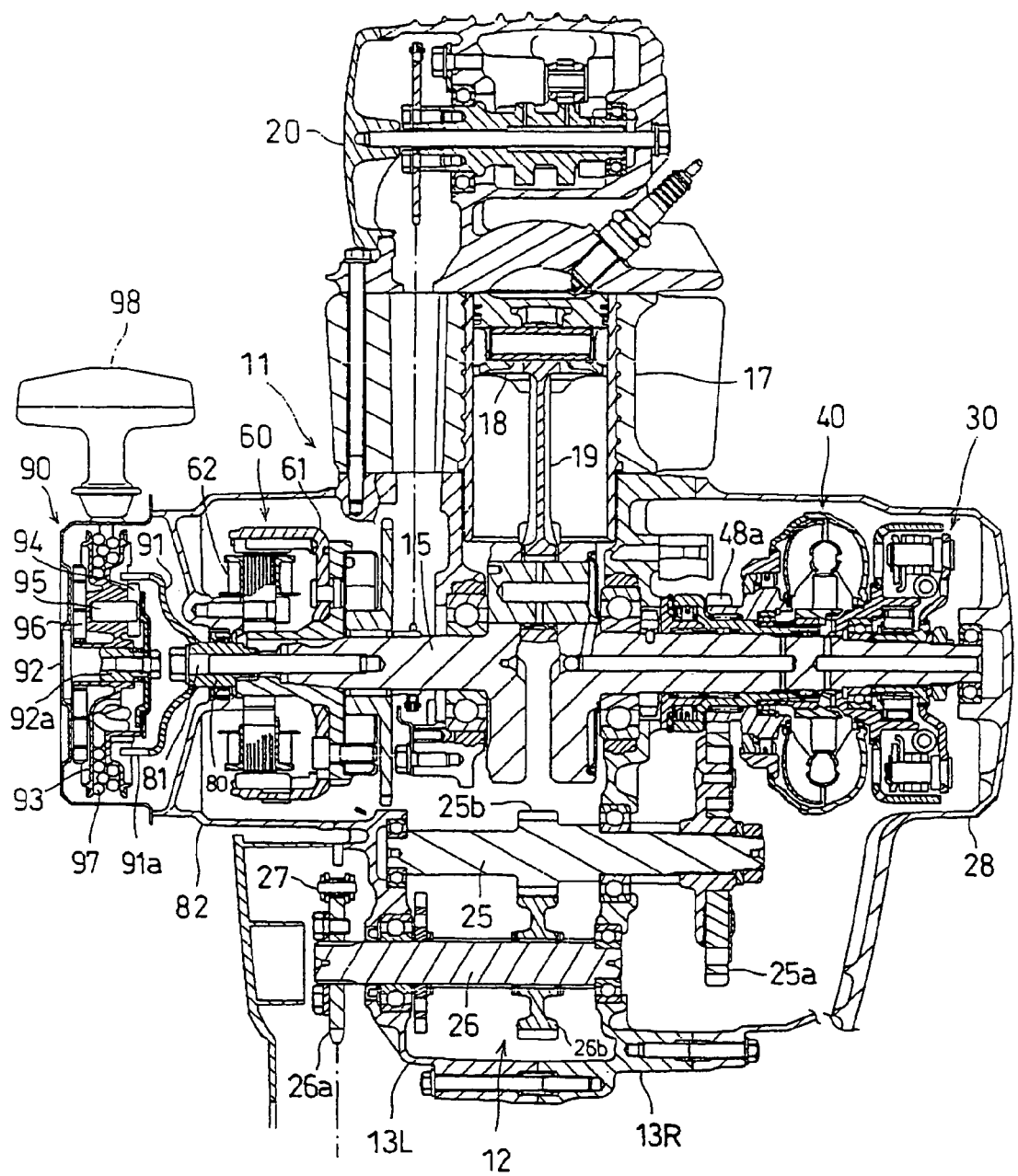
FIG. 4 is a vertical sectional view of a power unit according to another embodiment.

While the kick starter 70 has been used as a starting means in the above-described embodiment, an example in which a recoil starter 90 is used in place of the kick starter 70 is shown in FIG. 4.

The structure of other members of the power unit than the recoil starter 90 is the same as in the above embodiment, so that the members are denoted by the same symbols as used above.

The outer rotor 61 of the AC generator 60 is screwed and fastened to the left end of the crankshaft 15 through a boss member 80 by a bolt 81, and the inner stator 62 is fixedly supported on a left side cover 82 for covering the AC generator 60.

The boss member 80 penetrates through the center of the left side cover 82, the base end of a bowl-shaped ratchet wheel 91 is attached to a projecting left end portion of the boss member 80 and a ratchet pawl 91a of the ratchet wheel 91 projects leftwardly from the ratchet wheel 91.

A boss 92a projects on the inside surface of the starter cover 92 covering the ratchet wheel 91 from the left side and coaxially with the crankshaft 15. A starter pulley 93 is turnably shaft-supported on the boss 92a.

The starter pulley 93 is biased in one rotating direction by a coil form return spring 96 with an end portion of a rope 97 wound around the outer circumference of the starter pulley 93 being bound to a starter grip 98 disposed in the exterior of the starter cover 92.

An oscillating ratchet pawl 94 is shaft-supported on the right side surface of the starter pulley 93 by a pin 95 with a friction plate 99 being fixed to the boss 92a so as to make sliding contact with the right side surface of the oscillating ratchet pawl 94. When the oscillating ratchet pawl 94 is rotated together with the starter pulley 93, a tip end portion thereof is oscillated in the direction of the outer circumference due to the sliding contact with the friction plate 99 to become capable of engagement with the ratchet pawl 91a of the ratchet member 91 integral with the crankshaft 15.

Therefore, when the starter grip 98 is pulled to thereby rotate the starter pulley 93 through the rope 97, the oscillating ratchet pawl 94 rotated together with the starter pulley 93 makes sliding contact with the friction plate 99, whereby the tip end portion thereof is oscillated to be engaged with the ratchet pawl 91a of the ratchet member 91 and the crankshaft 15 is thereby rotated, to start the internal combustion engine 11.

The drive force of the starting means is inputted to the shaft end, located on the outer side relative to the AC generator 60, of the crankshaft 15, and the starting means main body can be disposed in the exterior of the internal combustion engine. Therefore, as in this example, the recoil starter 90 can be easily mounted in place of the kick starter 70.

Furthermore, a cell motor can also be mounted, so that an optimum starting means among a cell motor, a kick starter, and a recoil starter can be selectively used and easily changed according to the machine model, which promises high versatility.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission system for a vehicle, comprising: a clutch and a fluid transmission means through both of which a rotational torque of a crankshaft of an internal combustion engine is transmitted to a load-side transmission mechanism, the clutch and said fluid transmission means are both provided on one side of said crankshaft; and a chain sprocket around which a power transmission chain is wrapped and a starting means both of which are provided on the other side of said crankshaft, wherein a drive force of the starting means is inputted directly to the crankshaft, wherein said starting means is a kick-type starting means, and an exhaust pipe and a muffler are disposed on the opposite side, with respect to the vehicle body, of said kick-type starting means, and wherein a kick-type starting means cover is joined to a left end surface of a left side cover.

2. The power transmission system for a vehicle as set forth in claim 1, wherein said fluid transmission means is a torque converter, and said load-side transmission mechanism is a gear mechanism having a fixed speed change ratio.

3. The power transmission system for a vehicle as set forth in claim 2, wherein an AC generator is provided between the chain sprocket and the starting means on the side of the crankshaft on which said drive force of said starting means is inputted.

4. The power transmission system for a vehicle as set forth in claim 3, wherein said drive force of said starting means is inputted to a shaft end of said crankshaft located on the outer side relative to said AC generator.

5. The power transmission system for a vehicle as set forth in claim 1, wherein an AC generator is provided between the chain sprocket and the starting means on the side of the crankshaft on which said drive force of said starting means is inputted.

6. The power transmission system for a vehicle as set forth in claim 5, wherein said drive force of said starting means is inputted to a shaft end of said crankshaft located on the outer side relative to said AC generator.

7. The power transmission system for a vehicle as set forth in claim 1, wherein the chain sprocket is secured to said crankshaft and the power transmission chain is operatively connected between said chain sprocket and a camshaft for transmitting rotation thereto.

8. The power transmission system for a vehicle as set forth in claim 1, wherein said starting means cover includes a support portion for supporting the crankshaft and a ratchet shaft mounted relative to the support portion for selectively providing a rotary motion to said crankshaft.

9. A power transmission system for a vehicle, comprising:
a clutch;
a fluid transmission means operatively connected to said clutch;
a load-side transmission mechanism operatively connected to a crankshaft of an internal combustion engine, a rotational torque of said crankshaft is transmitted to the load-side transmission mechanism through said clutch and said fluid transmission means;
said crankshaft including a proximal end and a distal end, said clutch and said fluid transmission means are both mounted on the proximal end of said crankshaft; and
a chain sprocket around which a power transmission chain is wrapped and a starting means both of which are provided to the distal end of said crankshaft,
wherein a drive force of the starting means is inputted directly to the distal end of the crankshaft,
wherein said starting means is a kick-type starting means, and an exhaust pipe and a muffler are disposed on the opposite side, with respect to the vehicle body, of said kick-type starting means, and
wherein a kick-type starting means cover is joined to a left end surface of a left side cover.

10. The power transmission system for a vehicle as set forth in claim 9, wherein said fluid transmission means is a torque converter, and said load-side transmission mechanism is a gear mechanism having a fixed speed change ratio.

11. The power transmission system for a vehicle as set forth in claim 10, wherein an AC generator is provided between the chain sprocket and the starting means on the distal end of said crankshaft.

12. The power transmission system for a vehicle as set forth in claim 11, wherein said drive force of said starting means is inputted to the distal end of said crankshaft located on the outer side relative to said AC generator.

13. The power transmission system for a vehicle as set forth in claim 9, wherein an AC generator is provided between the chain sprocket and the starting means on the distal end of said crankshaft.

14. The power transmission system for a vehicle as set forth in claim 13, wherein said drive force of said starting means is inputted to the distal end of said crankshaft located on the outer side relative to said AC generator.

15. The power transmission system for a vehicle as set forth in claim 11, wherein the chain sprocket is secured to said crankshaft and the power transmission chain is operatively connected between said chain sprocket and a camshaft for transmitting rotation thereto.

16. The power transmission system for a vehicle as set forth in claim 9, wherein said starting means cover includes a support portion for supporting the distal end of the crankshaft and a ratchet shaft mounted relative to the support portion for selectively providing a rotary motion to said crankshaft.

* * * * *